US008468360B2

(12) United States Patent
Morita et al.

(10) Patent No.: US 8,468,360 B2
(45) Date of Patent: Jun. 18, 2013

(54) CLIENT TERMINAL, SERVER, SERVER-CLIENT SYSTEM, COOPERATION PROCESSING METHOD, PROGRAM AND RECORDING MEDIUM

(75) Inventors: Hideo Morita, Osaka (JP); Hideaki Takechi, Osaka (JP)

(73) Assignee: Panasonic Corporation, Osaka (JP)

( * ) Notice: Subject to any disclaimer, the term of this patent is extended or adjusted under 35 U.S.C. 154(b) by 160 days.

(21) Appl. No.: 13/061,606

(22) PCT Filed: May 20, 2010

(86) PCT No.: PCT/JP2010/003400
§ 371 (c)(1),
(2), (4) Date: Mar. 1, 2011

(87) PCT Pub. No.: WO2011/027492
PCT Pub. Date: Mar. 10, 2011

(65) Prior Publication Data
US 2011/0246781 A1    Oct. 6, 2011

(30) Foreign Application Priority Data
Sep. 4, 2009   (JP) .................................. 2009-204264

(51) Int. Cl.
*H04L 9/32* (2006.01)
(52) U.S. Cl.
USPC ........................................................ 713/180
(58) Field of Classification Search
USPC ........................................................ 713/180
See application file for complete search history.

(56) References Cited

U.S. PATENT DOCUMENTS

| 6,105,012 | A | 8/2000 | Chang et al. |
| 2002/0065912 | A1 | 5/2002 | Catchpole et al. |
| 2002/0178187 | A1 | 11/2002 | Rasmussen et al. |
| 2003/0212592 | A1 | 11/2003 | Murray |
| 2004/0187003 | A1* | 9/2004 | Philips .......................... 713/176 |
| 2004/0193699 | A1 | 9/2004 | Heymann et al. |
| 2005/0289641 | A1* | 12/2005 | Miura et al. ...................... 726/4 |
| 2006/0046686 | A1 | 3/2006 | Hawkins et al. |
| 2007/0190977 | A1 | 8/2007 | Fok et al. |
| 2008/0301766 | A1 | 12/2008 | Makino et al. |
| 2012/0131143 | A1* | 5/2012 | Nakazawa ..................... 709/218 |

FOREIGN PATENT DOCUMENTS

| JP | 2006-59267 | 3/2006 |
| JP | 2006-508622 | 3/2006 |
| JP | 2008-299414 | 12/2008 |

OTHER PUBLICATIONS

International Search Report issued Aug. 17, 2010 in corresponding International Application No. PCT/JP2010/003400.

* cited by examiner

*Primary Examiner* — Jacob Lipman
(74) *Attorney, Agent, or Firm* — Wenderoth, Lind & Ponack, L.L.P.

(57) ABSTRACT

An application on a client terminal transmits application session information indicating a state of the application itself and an application signature proving the identity of the application to a browser. The browser transmits the application session information and the application signature to a server. The server generates an HTML page in which a script specifying an operation to be performed by the application is inserted and server session information and transmits the HTML page and the server session information to the browser along with the application signature received from the browser. When the script is activated, the browser passes the information received from the server to the application. The application performs processing according to the server session information only if the application signature passed from the browser is an application signature generated by the application itself.

8 Claims, 7 Drawing Sheets

CLIENT TERMINAL, SERVER, SERVER-CLIENT SYSTEM, COOPERATION PROCESSING METHOD, PROGRAM AND RECORDING MEDIUM

CROSS-REFERENCE TO RELATED APPLICATIONS

This application is a U.S. national phase application of PCT International Patent Application No. PCT/JP2010/003400 filed May 20, 2010, claiming the benefit of priority of Japanese Patent Application No. 2009-204264 filed Sep. 4, 2009, all of which are incorporated by reference herein in their entirety.

TECHNICAL FIELD

The present invention relates to a client terminal, a server, a server-client system in which a client is connected to a server through a network, a cooperation processing method and the like. For example, the present invention relates to a client terminal, a server, a server-client system and a cooperation processing method capable of downloading or reproducing in streaming audio and video contents which are stored on a server through a network.

BACKGROUND ART

With the rapid development of the Internet technology in recent years, Web systems such as Internet and intranet systems that use WWW have become widely used. In such a Web system, requests and responses for particular processing (for example display of a page) are transmitted repeatedly between a Web browser on a client terminal and a server, thereby various services such as database search or online shopping services are provided.

Such Web systems typically use a connectionless communication protocol such as the HTTP (Hyper Text Transfer Protocol). Therefore a session needs to be established for each process when a series of services including multiple processes is performed. For example, when data is searched for through a Web browser and then a refined search is performed, the first session is closed once a main search page has been displayed on the Web browser, and a new session needs to be established in order to display the next, refined search page.

In such a Web system, in order to associate multiple sessions established for providing a series of services with one another, session information is passed every time a request is sent from a client terminal to a server and every time a response is sent from the server to the client terminal, thereby managing the sessions between the client and the server.

There are various methods for managing sessions. For example as the session management methods, there are URL encoding, server cookies, and hidden fields of HTML. These session management methods are useful in communication between a Web browser on a client terminal and a server.

However, when a local application is running on the client terminal besides a Web browser and the Web browser and the local application cooperate with each other, any of the session management methods cannot be used for managing three-way sessions among the local application, the Web browser and a server since the methods do not have a way to pass processes (sessions) of the local application to the Web browser.

A technique for passing information and sessions obtained from a server to a local application through a Web browser has been proposed, in which an applet on a Web browser and a client-server application (local application) on a client terminal pass information to and from each other through a socket (see for example Japanese Laid-open Patent Publication No. 2006-059267).

SUMMARY OF INVENTION

Technical Problem

However, the technique disclosed in Japanese Laid-Open Patent Publication No. 2006-59267 has a security problem because in the event that the Web browser on the client terminal has obtained information or a session from a malicious server, the local application can be unauthorizedly manipulated by the malicious server.

With the technique proposed in Japanese Laid-Open Patent Publication No. 2006-59267, the local application on the client terminal cannot verify whether information passed from the Web browser is from an authorized server or not.

In light of the problem with the existing technique, an object of the present invention is to provide a client terminal, a server, a server-client system, a cooperation processing method and the like in a client-server system in which a client terminal including a Web browser and a local application communicates with a server that enable the local application to verify whether information received by the Web browser is from an authorized server or not when the Web browser passes the information to the local application.

SUMMARY OF THE INVENTION

The $1^{st}$ aspect of the present invention is a client terminal connected to a server through a network, the client terminal comprising a browser and an application different from the browser, the browser comprising:

a network transmitting section transmitting application session information and an application signature received from the application, to the server, the application session information indicating a state of the application, the application signature proving an identity of the application;

a network receiving section receiving from the server an HTML page generated by the server according to the application session information, server session information generated by the server from the application session information, and the application signature received by the server, the HTML page including an inserted script instructing the application to perform an operation;

an HTML displaying section displaying the HTML page received from the server, the HTML page including the inserted script; and a session transmitting section transmitting the server session information and the application signature received from the server to the application in response to activation of the script;

the application comprising:

an application session generating section generating the application session information;

an application signature generating section generating the application signature;

an application session transmitting section transmitting the application session information and the application signature to the browser;

an application signature verifying section verifying whether or not the application signature received from the browser is the application signature generated by the application signature generating section; and an application control section providing control so that a processing according to the server session information received from the browser, is performed only if the application signature received from the browser is the application signature generated by the application signature generating section.

The $2^{nd}$ aspect of the present invention is the client terminal according to the $1^{st}$ aspect of the present invention, wherein:

the server session information received by the network receiving section includes application state setting information inserted by the server, the application state setting information specifying a state of the application; and the application control section extracts the application state setting information from the server session information received from the browser and sets the state of the application according to the application state setting information only if the application signature received from the browser is the application signature generated by the application signature generating section.

The $3^{rd}$ aspect of the present invention is the client terminal according to the $1^{st}$ aspect of the present invention, wherein:

the application comprises an encrypted signature decrypting section decrypting the application signature encrypted in a format unreadable by the server;

the application signature generating section encrypts the generated application signature into a format unreadable by the server;

the application session transmitting section transmits, instead of the application signature, the application signature encrypted by the application signature generating section, to the browser;

the encrypted signature decrypting section decrypts the encrypted application signature received from the browser; and the application signature verifying section verifies whether or not the application signature decrypted by the encrypted signature decrypting section is the application signature generated by the application signature generating section.

The $4^{th}$ aspect of the present invention is the client terminal according to the $1^{st}$ aspect of the present invention, wherein:

the application can be obtained through the network, and is one of a plurality of applications that can be obtained through the network; and the browser is capable of connecting to more than one of the plurality of applications.

The $5^{th}$ aspect of the present invention is a server connected to a client terminal through a network, wherein a browser and an application different from the browser are running on the client terminal, the server comprising:

a server receiving section receiving application session information generated by the application and an application signature generated by the application from the browser, the application session information indicating a state of the application, the application signature proving an identity of the application;

an HTML generating section generating an HTML page according to the received application session information;

an application script generating section inserting a script into the HTML page, the script instructing the application to perform an operation;

a server session generating section generating server session information from the received application session information; and a server transmitting section transmitting the HTML page including the inserted script, the server session information, and the received application signature to the client terminal;

wherein the application signature is information for verifying a source server.

The $6^{th}$ aspect of the present invention is a server-client system comprising a client terminal and a server connected to the client terminal through a network, wherein a browser and an application different from the browser are running on the client terminal, the application comprising:

an application session generating section generating application session information indicating a state of the application;

an application signature generating section generating an application signature proving an identity of the application;

an application session transmitting section transmitting the application session information and the application signature to the browser;

an application signature verifying section verifying whether or not the application signature received from the browser is the application signature generated by the application signature generating section; and an application control section providing control so that a processing according to server session information received from the browser, is performed only if the application signature received from the browser is the application signature generated by the application signature generating section;

the server comprising:

a server receiving section receiving the application session information and the application signature from the browser;

an HTML generating section generating an HTML page according to the received application session information;

an application script generating section inserting a script into the HTML page, the script instructing the application to perform an operation;

a server session generating section generating the server session information from the received application session information; and a server transmitting section transmitting the HTML page including the inserted script, the server session information, and the received application signature to the browser;

the browser comprising:

a network transmitting section transmitting the application session information and the application signature received from the application session transmitting section, to the server;

a network receiving section receiving the HTML page including the inserted script, the server session information, and the application signature from the server;

an HTML displaying section displaying the HTML page received from the server, the HTML page including the inserted script; and a session transmitting section transmitting the server session information and the application signature received from the server to the application in response to activation of the script.

The $7^{th}$ aspect of the present invention is a cooperation processing method in a server-client system comprising a client terminal and a server connected to the client through a network, wherein a browser and an application different from the browser are running on the client terminal, the cooperation processing method comprising:

an application session transmitting step of transmitting application session information and an application signature from the application to the browser, the application session information indicating a state of the application, the application signature proving an identity of the application;

a network transmitting step of transmitting the application session information and the application signature received from the application, from the browser to the server;

an HTML generating step of, by the server, generating an HTML page according to the received application session information and inserting a script into the HTML page, the script instructing the application to perform an operation;

a server session generating step of, by the server, generating server session information from the received application session information;

a server transmitting step of transmitting the HTML page including the inserted script, the server session information, and the received application signature from the server to the browser;

an HTML displaying step of, by the browser, displaying the HTML page received from the server, the HTML page including the inserted script;

a session transmitting step of transmitting the server session information and the application signature received from the server, from the browser to the application in response to activation of the script;

an application signature verifying step of verifying whether or not the application signature received from the browser is the application signature generated by the application itself; and an application control step of causing the application to perform processing according to the server session information only if the application signature received from the browser is the application signature generated by the application itself.

The 8$^{th}$ aspect of the present invention is a non-transitory computer-readable medium having a program stored thereon for causing a computer to execute the cooperation processing method according to the 7$^{th}$ aspect of the present invention.

ADVANTAGEOUS EFFECTS OF INVENTION

The present invention can provide a client terminal, a server, a server-client system, a cooperation processing method and the like in a client-server system in which a client terminal including a Web browser and a local application communicates with a server that enable the local application to verify whether information received by the Web browser is from an authorized server or not when the Web browser passes the information to the local application.

BRIEF DESCRIPTION OF DRAWINGS

FIG. 7($b$) is a diagram illustrating a configuration of a client terminal on which multiple local applications use a single Web browser in the embodiment of the present invention.

DESCRIPTION OF EMBODIMENTS

Embodiments of the present invention will be described below with reference to drawings.

Embodiments

Figure 1:
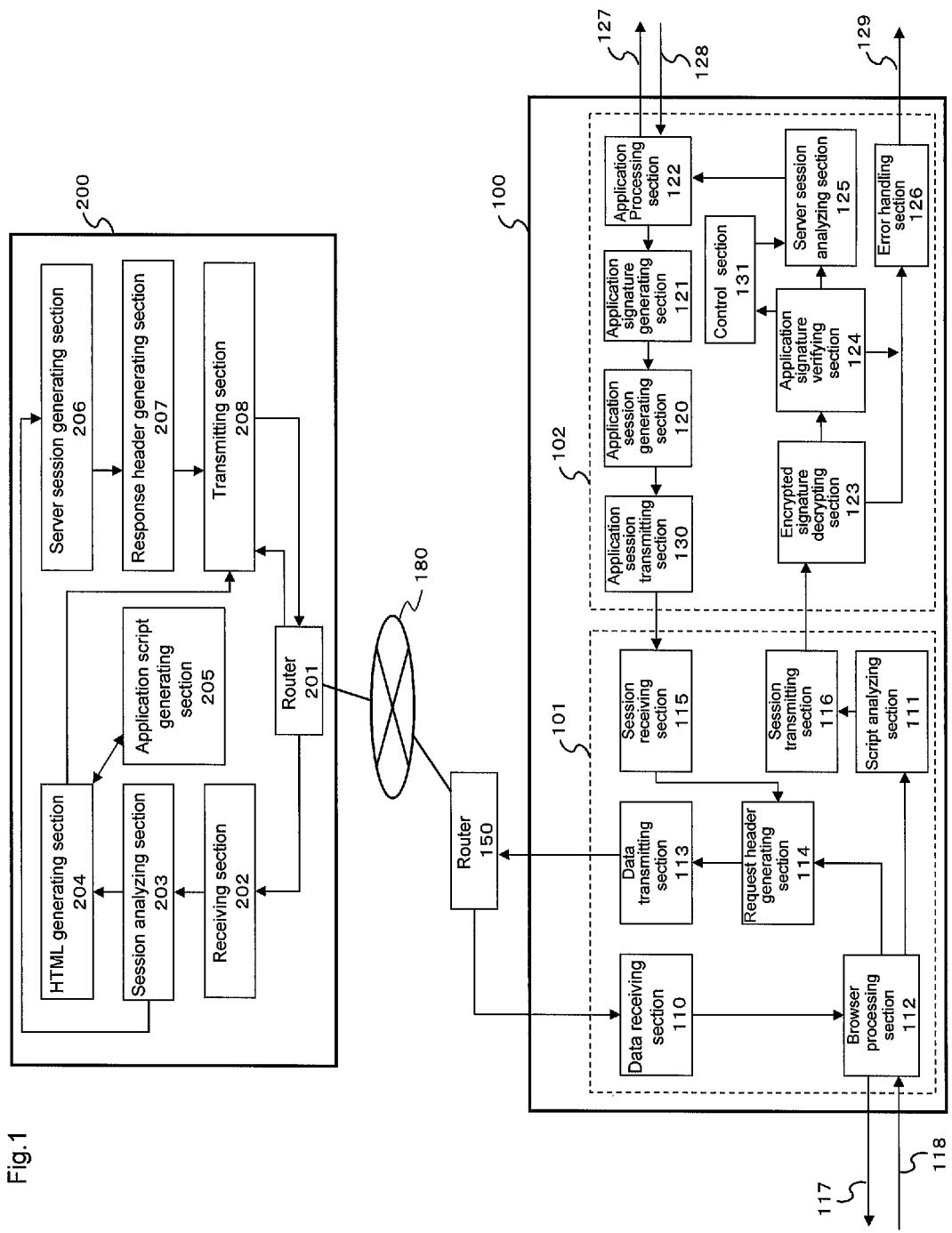
FIG. 1 is a block diagram of a client terminal and a server in a server-client system of an embodiment of the present invention.

FIG. 1 is a block diagram of a client terminal and a server in a server-client system of an embodiment of the present invention.

The client terminal 100 and the server 200 are interconnected through a network 180.

The client terminal 100 is typically connected onto the network 180 through a router 150 which relays IP traffic. It is assumed here that multiple terminals having the same configuration as the client terminal 100 are connected onto the network 180.

It is assumed that the client terminal 100 communicates with the server 200 and a local application 102 on the client terminal 100 communicates with the server 200 through a Web browser 101.

The client terminal 100 includes the Web browser 101 and the local application 102.

Figure 4:
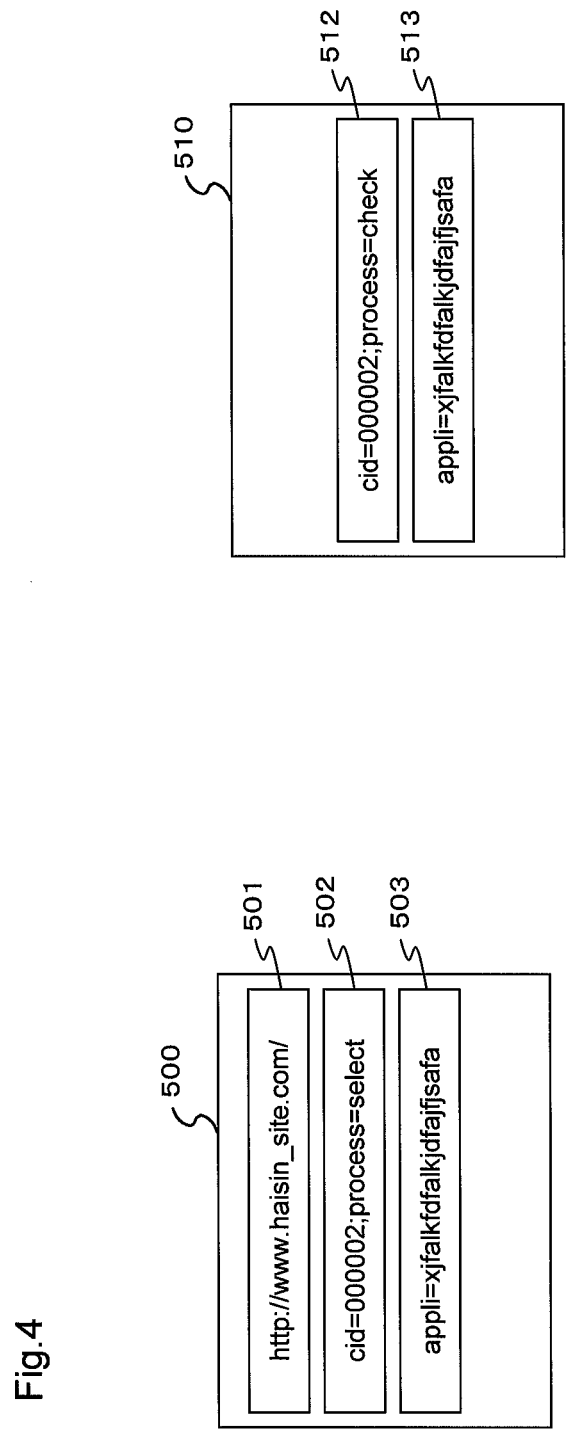
FIG. 4 is a diagram illustrating structures of data passed between the Web browser and the local application on the client terminal in the embodiment of the present invention.

FIG. 4 illustrates structures of data passed between the Web browser 101 and the local application 102 in the present embodiment.

Data 500 represents an exemplary structure of data passed from the local application 102 to the Web browser 101. The data 500 includes a distribution server host URL 501, session information 502 and an encrypted application signature 503.

Data 510 represents an exemplary structure of data passed from the Web browser 101 to the local application 102. The data 510 includes session information 512 and an encrypted application signature 513.

The session information 502 is an example of an application session information of the present invention and the session information 512 is an example of a server session information of the present invention.

The Web browser 101 includes a data receiving section 110, a script analyzing section 111, a browser processing section 112, a data transmitting section 113, a request header generating section 114, a session receiving section 115, and a session transmitting section 116. A browser information input 118 and a browser information display 117 are an input to and an output from the browser processing section 112.

The local application 102 includes an application session generating section 120, an application signature generating section 121, an application processing section 122, an encrypted signature decrypting section 123, an application signature verifying section 124, a server session analyzing section 125, an error handling section 126, an application session transmitting section 130, and a control section 131. An application information input 128 and an application information display 127 are an input to and an output from the application processing section 122. An error information display 129 is an output from the error handling section 126.

The Web browser 101 is an example of a browser of the present invention and the local application 102 is an example of an application of the present invention. The control section 131 is an example of an application control section of the present invention. The data transmitting section 113 is an example of a network transmitting section of the present invention and the data receiving section 110 is an example of a network receiving section of the present invention. The browser processing section 112 is an example of an HTML displaying section of the present invention.

The Web browser 101 and the local application 102 on the client terminal 100 may be implemented by dedicated processing hardware components, or may be implemented by separate software programs and a CPU of the client terminal 100 may interpret and run the software programs.

The local application 102 presents to a user a list of contents recorded on the client terminal 100 and a list of meta information (such as the titles and prices of contents) concerning delivery contents obtained previously from the server 200, through the application information display 127. The local application 102 receives an operation from a user through the application information input 128 to perform the operation on the list of contents displayed.

The application processing section 122 receives an operation from the user through the application information input 128 and performs processing corresponding to the operation. In this way the application processing section 122 performs display processing through the application information display 127 or passes content identification information contained in meta information concerning a selected content by the user and a distribution server host URL 501 of a distribution content server (the URL of the server 200 in the present embodiment) to the application signature generating section 121 and instructs the application signature generating section 121 to generate an encrypted signature. The application processing section 122 also includes the function of displaying an on-screen display through the application information display 127 according to an instruction received from the server session analyzing section 125.

The application signature generating section 121, in response to an instruction from the application processing section 122, generates an application signature that uniquely identifies the local application 102 itself, and encrypts the generated application signature to generate an encrypted application signature 503 that only the local application 102 can decrypt. The application signature generating section 121 passes the encrypted application signature 503 to the application session generating section 120 along with the identification information of the content and the distribution server host URL 501.

The application session generating section 120 generates session information 502 from the content identification information passed to it and the state of processing that the local application 102 has been performing and passes the session information 502 to the application session transmitting section 130 along with the distribution server host URL 501 and the encrypted application signature 503. Here, the session information 502 is in a format understandable at least to the server 200, the Web browser 101 and the local application 102.

The application session transmitting section 130 passes the distribution server host URL 501, the session information 502 and the encrypted application signature 503 passed to it to the session receiving section 115 of the Web browser 101 as data 500 as illustrated in FIG. 4.

The encrypted signature decrypting section 123 extracts the encrypted application signature 513 from data 510 passed from the session transmitting section 116 of the Web browser 101. The encrypted signature decrypting section 123 then decrypts the encrypted application signature 513 extracted from the data 510. If the encrypted signature decrypting section 123 has successfully decrypted the encrypted application signature 513, the encrypted signature decrypting section 123 passes the application signature decrypted from the encrypted application signature 513 to the application signature verifying section 124. On the other hand, if the encrypted signature decrypting section 123 has failed to decrypt the encrypted application signature 513, the encrypted signature decrypting section 123 reports the failure to the error handling section 126.

The application signature verifying section 124 verifies whether or not the application signature passed from the encrypted signature decrypting section 123 belongs to the local application 102 itself. If the application signature belongs to the local application 102 itself, the application signature verifying section 124 extracts session information 512 from the data 510 and passes the session information 512 to the server session analyzing section 125. On the other hand, if the application signature does not belong to the local application 102 itself, the application signature verifying section 124 reports that to the error handling section 126.

The server session analyzing section 125 analyzes the session information 512 passed from the application signature verifying section 124 and instructs the application processing section 122 to display the local application 102 in a state specified in the session information 512.

The control section 131 controls the server session analyzing section 125 to cause the server session analyzing section 125 to analyze session information 512 if the application signature verifying section 124 verifies that the application signature received from the server belongs to the local application 102 itself, and controls the application processing section 122 to cause the application processing section 122 to operate according to the result of the analysis. The control section 131 may be configured to control operations of other sections as well.

The Web browser 101 transmits an HTTP request to the server 200 according to an instruction from the local application 102 or a browser information input 118 which is an operation performed by the user on the Web browser 101. The Web browser 101 also presents information in the HTML format obtained from the server 200 as an on-screen display to the user through the browser information display 117.

The data receiving section 110 receives an HTTP response from the server 200 and passes the HTTP response to the browser processing section 112.

The browser processing section 112 renders the HTML information in the HTTP response obtained from the data receiving section 110 and displays the rendered HTML information through the browser information display 117. If information provided through the browser information input 118 instructs to execute a script, the browser processing section 112 instructs the script analyzing section 111 to execute the script. When the Web browser 101 attempts to connect to the server 200, the browser processing section 112 instructs the HTTP request header generating section 114 to generate a request for the connection.

The script analyzing section 111 analyzes the script to be analyzed on the instruction of the browser processing section 112, extracts data 510, and passes the data 510 to the session transmitting section 116.

The session transmitting section 116 passes the data 510 passed from the script analyzing section 111 to the encrypted signature decrypting section 123 of the local application 102.

The request header generating section 114 generates a request header of the HTTP (see requests 520, 530 and 540 in FIG. 5, which will be described later) according to instructions from the browser processing section 112 and the session receiving section 115.

The data transmitting section 113 uses the HTTP request header passed from the request header generating section 114 to transmit an HTTP request to the server 200.

The session receiving section 115 receives data 500 passed from the application session transmitting section 130 of the local application 102 and instructs the request header generating section 114 to generate an appropriate HTTP request header from the data 500.

The server 200 includes a router 201, a receiving section 202, a session analyzing section 203, an HTML generating section 204, an application script generating section 205, a server session generating section 206, a response header generating section 207, and a transmitting section 208.

The receiving section 202 is an example of a server receiving section of the present invention and the transmitting section 208 is an example of a server transmitting section of the present invention.

The receiving section 202 receives an HTTP request from a client terminal 100 through the router 201 and passes the HTTP request to the session analyzing section 203.

The session analyzing section 203 extracts session information 502 from the HTTP request passed from the receiving section 202, analyzes the session information 502, and instructs the HTML generating section 204 to generate HTML according to the session information 502. The session analyzing section 203 instructs the server session generating section 206 to generate an appropriate session for an HTTP response.

The HTML generating section 204 generates appropriate HTML in response to the instruction from the session analyzing section 203 and passes the HTML to the transmitting section 208. Here, if an instruction to the local application 102 needs to be contained in the HTML, the HTML generating section 204 instructs the application script generating section 205 to generate a script, inserts the script generated by the application script generating section 205 into the HTML, and passes the HTML containing the script to the transmitting section 208.

The server session generating section 206, in response to the instruction from the session analyzing section 203, generates appropriate session information 512 specifying an operation to be performed next by the client terminal 100 and passes the session information 512 to the response header generating section 207.

The response header generating section 207 uses the session information 512 passed from the server session generating section 206 to generate an HTTP response header and passes the HTTP response header to the transmitting section 208.

The transmitting section 208 generates an HTTP response from the HTTP response header passed from the response header generating section 207, the HTML passed from the HTML generating section 204, and the encrypted application signature 503 in the HTTP request from the client terminal 100, obtained from the router 201 and held, and transmits the HTTP response to the client terminal 100 through the router 201.

Screen transitions on the client terminal 100 of the present embodiment will be described below with reference to FIG. 2.

Figure 2:
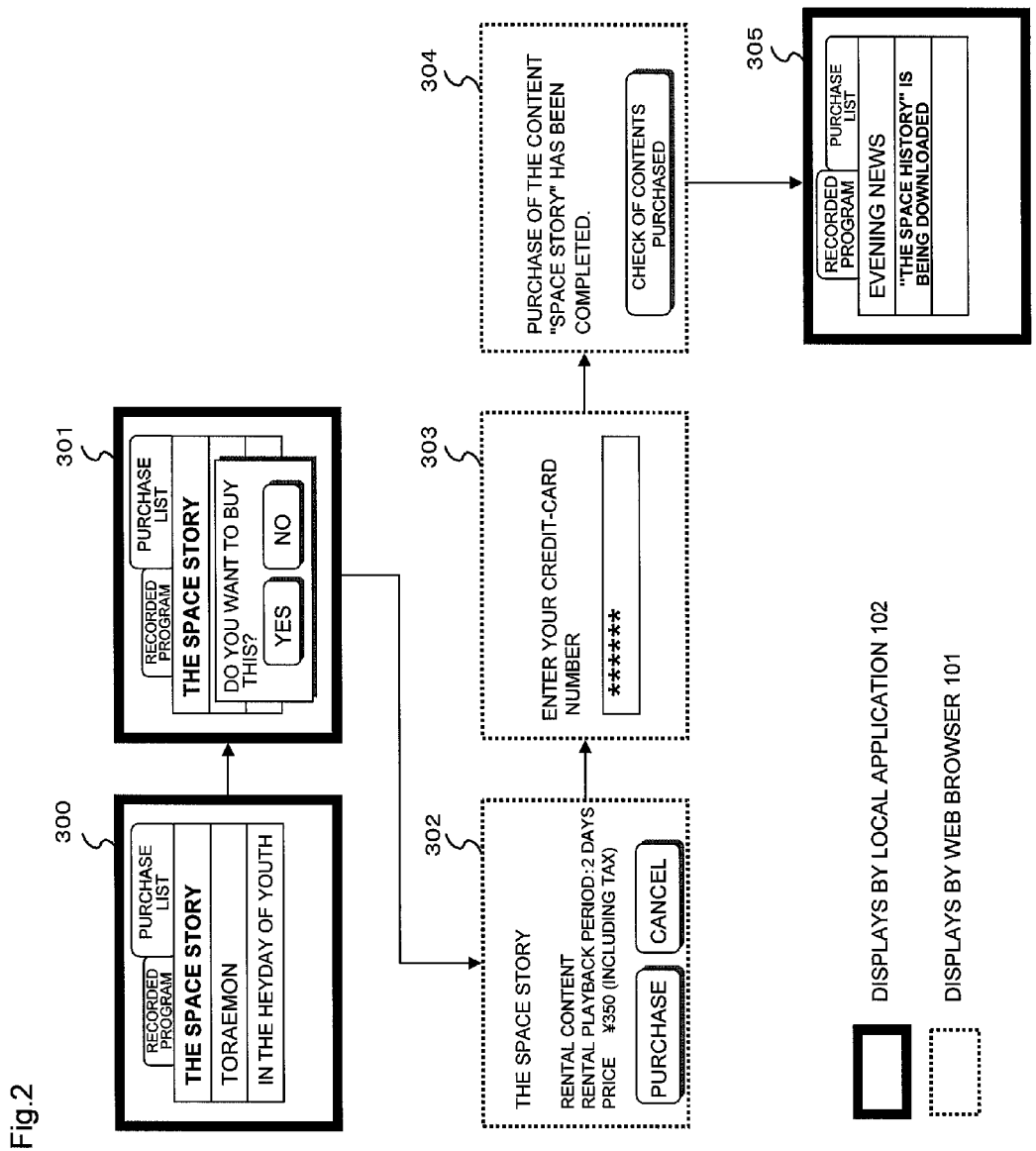
FIG. 2 is a diagram illustrating screen transitions on the client terminal in the embodiment of the present invention.

FIG. 2 illustrates exemplary screen transitions on the client terminal 100 of the present embodiment. The screen transitions are illustrative only and do not limit the scope of the present invention.

On-screen displays 300, 301 and 305 in FIG. 2 are displayed by the local application 102 on the client terminal 100. On-screen displays 302, 303 and 304 are displayed by the Web browser 101 on the client terminal 100.

The on-screen display 300 presents a "purchase list" that lists meta information (such as the title of the content) concerning delivery contents obtained beforehand from the server 200. A user selects a content that the user wants to purchase from the purchase list by operating a remote control or the like. Once a content has been selected, the screen changes to the on-screen display 301. It is assumed here that the user has selected "The Space Story". The focus is placed on "The Space Story" on the on-screen display 300 illustrated.

The on-screen display 301 is a display for asking the user whether to purchase the content that the user selected. When the user selects "YES" here, the screen changes to the on-screen display 302.

The on-screen display 302 displays HTML that the Web browser 101 has obtained from the server 200. The on-screen display 302 displays detailed information (such as the title, type, rental playback period, price of the content) concerning the content that the user has just selected from the purchase list. Here, the title of the content "The Space Story", the type of the content "Rental content", and other information are displayed. When the user selects "PURCHASE" here, the screen changes to the on-screen display 303.

The on-screen display 303 displays HTML that the Web browser 101 has obtained from the server 200, like the on-screen display 302, and is a display for asking the user to enter a credit-card number or the like. Once the user has entered a credit-card number or the like in order to purchase the content, the screen changes to the on-screen display 304.

The on-screen display 304 displays HTML that the Web browser 101 has obtained from the server 200, like the on-screen display 302. The on-screen display 304 displays a result of the content purchase request made by the user. When the user selects "Check of contents purchased." here, the screen changes to the on-screen display 305.

The on-screen display 305 provides a list of contents recorded on the client terminal 100, to which the content "The Space Story" purchased through the procedure so far has been added. The focus is placed on the "The Space Story" just purchased.

A process sequence performed among the server 200, the Web browser 101, the local application 102 and the user 800 in the present embodiment will be described below with reference to FIGS. 1 to 3.

Figure 3:
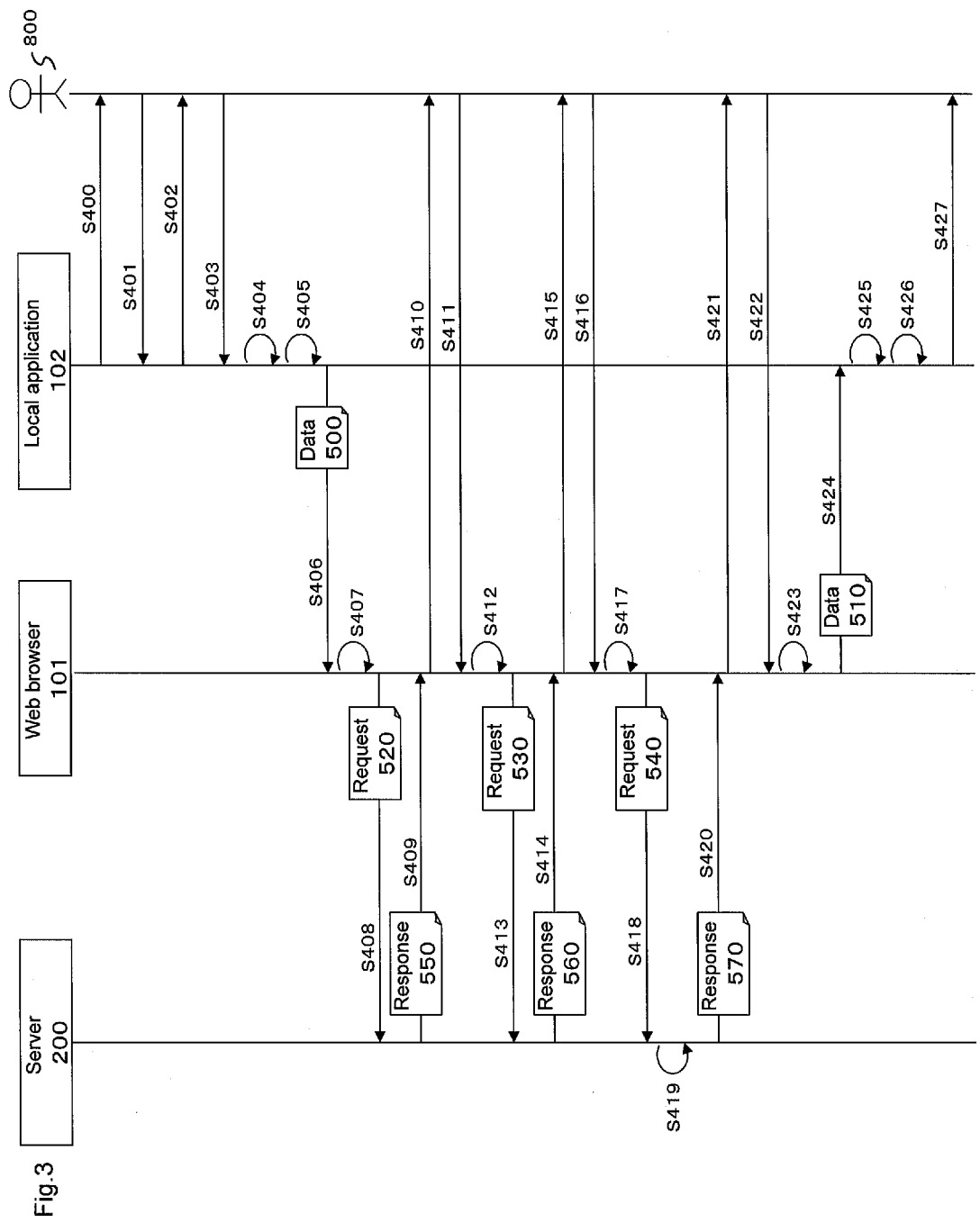
FIG. 3 is a diagram illustrating a sequence among the server, a Web browser, and a local application in the embodiment of the present invention.

FIG. 3 is a sequence diagram among the server 200, the Web browser 101 and the local application 102 in the present embodiment. Here, operations performed by the user 800 on the on-screen displays correspond to the screen transitions described above with reference to FIG. 2.

First, the application processing section 122 of the local application 102 renders the on-screen display 300 (S400) to present the on-screen display 300 in FIG. 2 to the user 800.

When the user 800 selects a content to purchase (S401), the application processing section 122 renders the on-screen display 301 (S402) and presents the on-screen display 301 to the user 800.

When the user selects PURCHASE (S403) on the on-screen display 301 and the application processing section 122 receives the instruction, the application signature generating section 121 encrypts an application signature that uniquely identifies the local application 102 itself to generate an encrypted application signature 503 (S404) and the application session generating section 120 generates session information 502 indicating the state of the local application 102 (S405).

Then the application session transmitting section 130 of the local application 102 sends an instruction to activate the Web browser 101 along with data 500 (S406).

The data 500 illustrated in FIG. 4 is an example of the structure of data 500 passed to the Web browser 101 during activation of the Web browser 101. Session information 502 at this point in time indicates a state that the user has selected the purchase of "The Space Story" (here, cid=000002) on the purchase list on the on-screen display 301 in FIG. 2 (process=select).

When the Web browser 101 receives the instruction to activate, the Web browser 101 uses the data 500 obtained at the session receiving section 115 to generate an HTTP request header in the request header generating section 114 (S407). The data transmitting section 113 uses a request 520 as an HTTP request and transmits the page purchase request to the server 200 (S408).

When the receiving section 202 of the server 200 receives the HTTP request through the router 201, the session analyzing section 203 analyzes the HTTP header, and the HTML generating section 204 generates appropriate HTML. The transmitting section 208 uses a response 550 as an HTTP response and transmits the purchase page (S409).

The browser processing section 112 of the Web browser 101 renders the on-screen display 302 and presents the on-screen display 302 to indicate detailed information concerning the content to the user 800 (S410). The user 800 selects "PURCHASE" on the on-screen display 302 (S411).

Then the request header generating section 114 generates an HTTP request header (S412). The data transmitting section 113 uses a request 530 as an HTTP request and transmits the payment page request to the server 200 (S413).

When the receiving section 202 of the server 200 receives the request 530, which is the payment page request, the session analyzing section 203 analyzes the HTTP header and the HTML generating section 204 generates appropriate HTML. The transmitting section 208 uses a response 560 which is a payment page response as an HTTP response and transmits the response 560 to the Web browser 101 (S414).

Then the browser processing section 112 of the Web browser 101 renders the on-screen display 303 and presents the on-screen display 303 to the user 800 (S415). The user 800 enters credit-card information on the on-screen display 303 (S416).

Then the request header generating section 114 generates an HTTP request header for requesting a check page (S417). The data transmitting section 113 uses a request 540 for a check page as an HTTP request and transmits the request 540 to the server 200 (S418).

When the receiving section 202 of the server 200 receives the HTTP request which is the request 540 for a check page, the session analyzing section 203 analyzes the HTTP header and the HTML generating section 204 generates appropriate HTML for displaying the check page. At the same time, in order to cause the local application 102 to display that the purchased content has been added to the client terminal 100, the application script generating section 205 generates a script for the local application 102 to cause the local application 102 to do so (S419).

Then the HTML generating section 204 inserts the script for instructing the local application 102 on the client terminal 100 into the HTML. The transmitting section 208 uses a response 570 as an HTTP response, which is a response to the check page request 540, and transmits the check page to the Web browser 101 (S420).

The browser processing section 112 of the Web browser 101 renders the on-screen display 304 to present the check page to the user 800 (S421). When the user 800 selects "Check of contents purchased." on the on-screen display 304 (S422), the script analyzing section 111 executes the application script inserted in the HTML of the response 570 (S423) and the session transmitting section 116 passes the data 510 to the local application 102 to pass the session to the local application 102 (S424).

The encrypted signature decrypting section 123 of the local application 102 to which the session has been passed decrypts the encrypted application signature 513 in the data 510 received from the Web browser 101 and the application signature verifying section 124 verifies whether the decrypted application signature is the signature of the local application 102 itself (S425).

If the encrypted signature decrypting section 123 fails to decrypt the encrypted application signature 513 or if the application signature verifying section 124 determines that the signature is invalid, the data can be deemed to have been not received from an authorized server and the error handling section 126 displays an error indication to the user 800. The process does not proceed to the subsequent step.

If the application signature generated by decrypting the encrypted application signature 513 is valid, the server session analyzing section 125 analyzes the session information 512 in the data 510 (S426) and the application processing section 122 displays an on-screen display (such as the on-screen display 305) corresponding to the result of the analysis of the session information 512 to the user 800 (S427).

The encrypted application signature 513 included in the data 510 is identical to the encrypted application signature 503 generated by the application signature generating section 121 unless the encrypted application signature 513 has been tampered with by an unauthorized server. If the encrypted application signature 513 differs from the encrypted application signature 503, the encrypted signature decrypting section 123 or the application signature verifying section 124 reports the signature as an invalid signature to the error handling section 126 as has been described previously. In that event, the information can be deemed to have been received from an unauthorized server.

Structures of requests and responses in the present embodiment will be described below with reference to FIG. 5.

Figure 5:
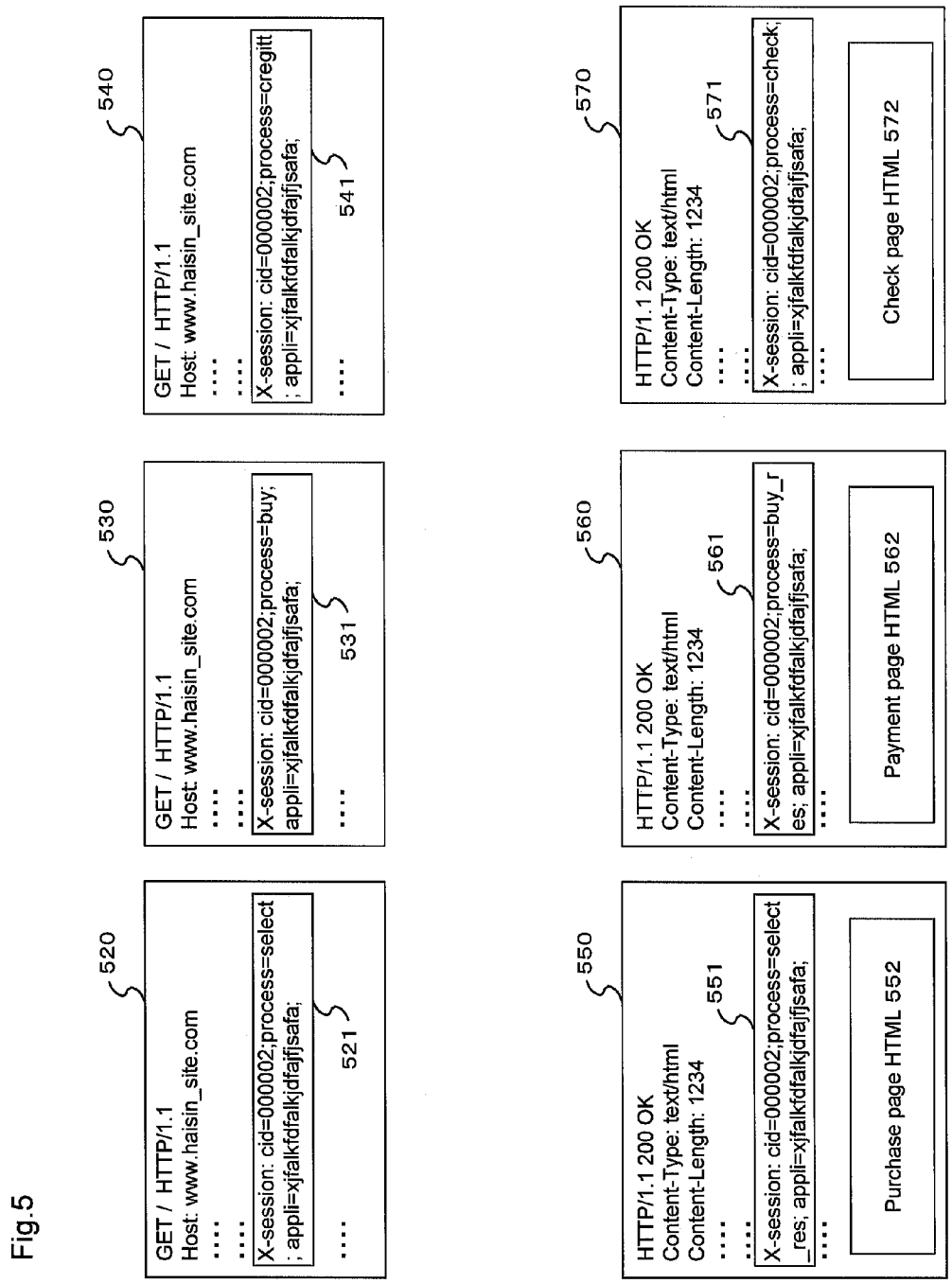
FIG. 5 is a diagram illustrating structures of requests and responses in the embodiment of the present invention.

FIG. 5 illustrates exemplary structures of requests transmitted from the client terminal 100 to the server 200 and responses transmitted from the server 200 to the client terminal 100 in the present embodiment. Requests 520, 530 and 540 and responses 550, 560 and 570 in FIG. 5 correspond to the requests and responses with the same numbers in FIG. 3.

The request 520 includes a standard HTTP header and an extension header 521. The extension header 521 is used for passing the session information 502 and the encrypted application signature 503 to the server 200. The use of the extension header is illustrative only and the way to pass the session information 502 and the encrypted application signature 503 to the server 200 is not limited to the extension header. The session information 502 and the encrypted application signature 503 may be passed to the server 200 as a URL encoding, which has the same effect as the extension header.

The request 530 includes a standard HTTP header and an extension header 531. The extension header 531 is used for indicating to the server 200 a state that a user 800 has selected PURCHASE (S411).

The request 540 includes a standard HTTP header and an extension header 541. The extension header 541 is used for indicating to the server 200 a state that the user 800 has entered credit-card information (S416).

The response 550 includes a standard HTTP header, an extension header 551 and a purchase page HTML 552. The extension header 551 is used for passing the session information 512 and the encrypted application signature 513 to the client terminal 100. The purchase page HTML 552 is rendered by the Web browser 101 to display the on-screen display 302.

The response 560 includes a standard HTTP header, an extension header 561 and payment page HTML 562. The payment page HTML 562 is rendered by the Web browser 101 to display the on-screen display 303.

The response 570 includes a standard HTTP header, an extension header 571 and check page HTML 572. The check page HTML 572 is rendered by the Web browser 101 to display the on-screen display 304.

HTML in the embodiment of the present invention will be described below with reference to FIG. 6.

Figure 6:
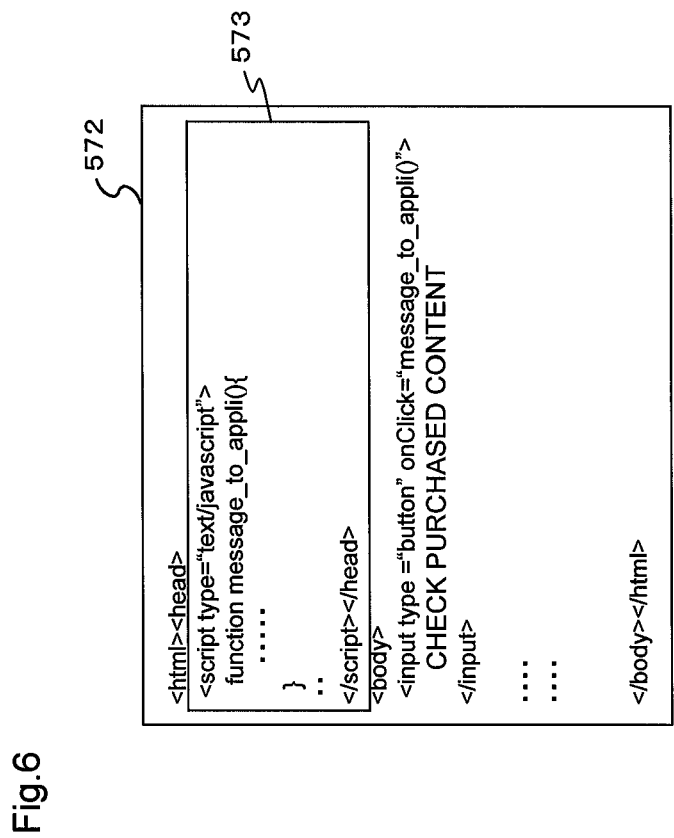
FIG. 6 is a diagram illustrating HTML in the embodiment of the present invention.

FIG. 6 illustrates a structure of the check page HTML 572 contained in the response 570 in FIG. 5.

The check page HTML 572 contains the application script 573 inserted by the server 200. When the user presses the "Check of contents purchased" button on the on-screen display 304, an OnClick event in a Java (registered trademark) script written in the HTML 572 occurs and a function defined in the application script 573 is executed. The execution of the function causes the session transmitting section 116 of the Web browser 101 to pass the session to the local application 102 (S424).

The server-client system of the present embodiment described above, on a client terminal 100 communicating with a server 200, has a remarkable advantageous effect that a local application 102 on the client terminal 100 can be prevented from being tampered with by a malicious server while sessions and information are being passed among the server 200, a Web browser 101 on the client terminal 100, and the local application 102 on the client terminal 100.

While the application signature generating section 121 generates an application signature that uniquely identifies the local application 102 itself and encrypts the application signature to generate an encrypted application signature 503 in the present embodiment, the application signature generating section 121 may only generate an application signature and the unencrypted application signature may be used in place of the encrypted application signature 503 described above.

In that case, data 510 passed from the session transmitting section 116 of the Web browser 101 to the local application 102 contains the unencrypted application signature, the encrypted signature decrypting section 123 does not need to decrypt the application signature and sends the application signature to the application signature verifying section 124 without making any change to the application signature. Accordingly, if an unencrypted application signature is used instead of an encrypted application signature 503, the encrypted signature decrypting section 123 may be omitted.

If an unencrypted application signature is used in this way, verification as to whether information is from an authorized server or not can be made by verifying whether the application signature passed from the Web browser 101 is an application signature generated by the local application 102.

While the server session generating section 206 on the server 200 generates appropriate session information 512 specifying an operation to be performed next by the client terminal 100 and the server session analyzing section 125 on the client terminal 100 causes the application processing section 122 to display an on-screen display corresponding to the result of the analysis of the session information 512 in the present embodiment, the server session generating section 206 may generate session information 512 including application state setting information that specifies a state of the local application 102 and the control section 131 of the local application 102 may set the state of the local application 102 according to the application state setting information contained in the session information 512.

Furthermore, the local application 102's function of passing information to and from the Web browser 101 in the present embodiment can be included in multiple local applications to allow the multiple local applications to pass information to and from the server through the Web browser 101.

Figure 7B:
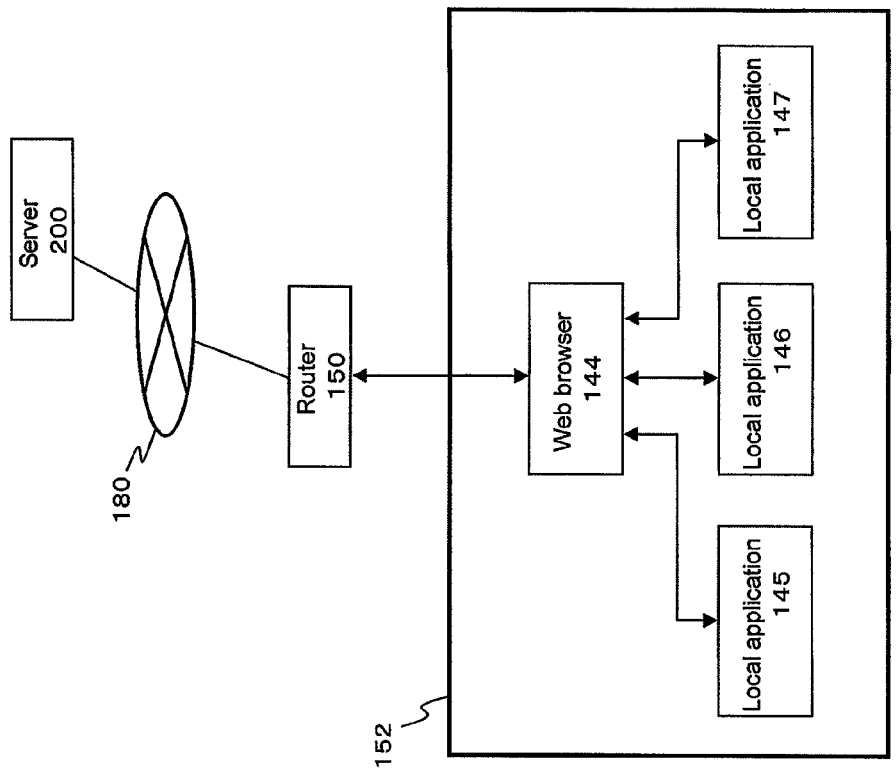
FIG. 7($a$) is a diagram illustrating a configuration of a client terminal on which multiple local applications use a single Web browser in the embodiment of the present invention.
Figure 7A:
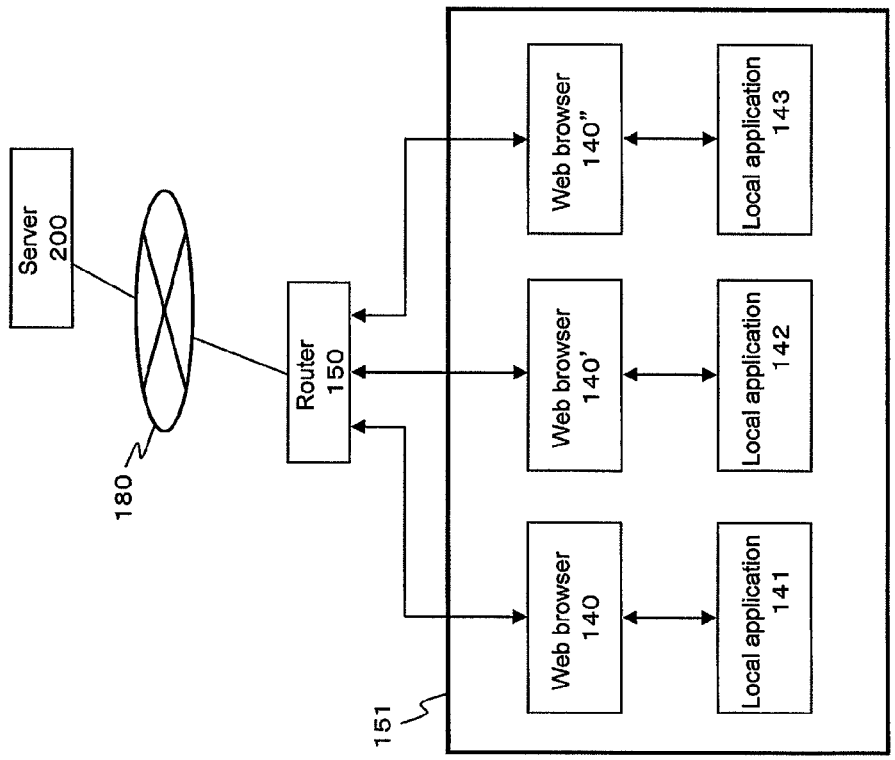

FIGS. 7(a) and 7(b) illustrate configurations of a client terminal on which multiple local applications use a single Web browser.

The configurations illustrated in FIGS. 7(a) and 7(b) are of the local applications and the Web browser in an active state of these programs.

Browsers 140, 140' and 140" on the client terminal 151 in FIG. 7(a) are multiple instances of the same program that are separately activated by the local applications 141, 141' and 141", respectively.

In this case, the local application 141 passes information to and from a server 200 through the browser 140 that the local application 141 has activated; the local application 142 passes information to and from the server 200 through the browser 140' that the local application 142 has activated; and the local application 143 passes information to and from the server 200 through the browser 140" the local application 143 has activated.

A browser 144 on a client terminal 152 in FIG. 7(b) includes the function of allowing multiple local applications to pass information by a single activated program. In this case, each of local applications 145, 146 and 147 passes information to and from a server 200 through the single activated instance of the browser 144.

The browser 144 uses information that identifies multiple local applications to enable the multiple local applications to pass information through the single activated instance of the browser as illustrated in FIG. 7(b). For example, the information that identifies the multiple local applications may be encrypted application signature 503 and encrypted application signature 513 that are passed to and from the browser 144 and the local applications.

By incorporating the function of passing information to and from a Web browser 101 into multiple local applications in this way, the need for providing a Web browser for each of the local applications is eliminated since the multiple local applications can be served by the single Web browser 101. Accordingly, the memory space of a recording medium such as HDD required for storing local application and Web browser programs is small.

Furthermore, a local application including the function of passing information to and from a Web browser 101 may be made downloadable through a network 180.

Moreover, the program of the present invention is a program for causing a computer to execute the operations of the application session transmitting step of transmitting application session information and an application signature from the application to the browser, the network transmitting step of transmitting the application session information and the application signature received from the application from the browser to the server, the HTML generating step of, by the server generating an HTML page and inserting a script instructing the application to perform an operation into the HTML page, the server transmitting step of transmitting the HTML page including the script inserted, the server session information, and the received application signature from the server to the browser, the session transmitting step of transmitting the server session information and the application signature from the browser to the application in response to activation of the script, the application signature verifying step of verifying whether or not the application signature received from the browser is an application signature generated by the application itself, and the application control step of causing the application to perform processing according to the server session information only if the application signature received from the browser is the application signature generated by the application itself, of the above-described cooperation processing method of the present invention and is a program which operates in cooperation with the computer.

Moreover, the recording medium of the present invention is a recording medium having recorded thereon a program for causing a computer to execute the application session transmitting step of transmitting application session information and an application signature from the application to the browser, the network transmitting step of transmitting the application session information and the application signature received from the application from the browser to the server, the HTML generating step of, by the server generating an HTML page and inserting a script instructing the application to perform an operation into the HTML page, the server transmitting step of transmitting the HTML page including the script inserted, the server session information, and the received application signature from the server to the browser, the session transmitting step of transmitting the server session information and the application signature from the browser to the application in response to activation of the script, the application signature verifying step of verifying whether or not the application signature received from the browser is an application signature generated by the application itself, and the application control step of causing the application to perform processing according to the server session information only if the application signature received from the browser is the application signature generated by the application itself, of the above-described cooperation processing method of the present invention and is a computer-readable recording medium, the program of which, when read, is used in cooperation with the computer.

Moreover, the above-mentioned "operation of the step" of the present invention means the operation of all or a part of the step.

Moreover, in one use form of the program according to the present invention, the program may be recorded in the recording medium such as ROM readable by the computer, and operated in cooperation with the computer.

Moreover, in another use form of the program according to the present invention, the program may be transmitted across the network such as the Internet, or through the transmission media such as light, electric wave or sound wave, read by the computer and operated in cooperation with the computer.

Moreover, the computer according to the present invention described above is not limited to the pure hardware such as CPU, but may comprise a firmware, OS, or peripheral devices.

As described above, the configuration of the present invention may be implemented by software or hardware.

INDUSTRIAL APPLICABILITY

The client terminal, the server, the server-client system, the cooperation processing method and the like according to the present invention have an effect of enabling the local application to verify whether information received by the Web browser is from an authorized server or not when the Web browser passes the information to the local application and are useful as a client terminal, a server, a server-client system, a cooperation processing method and the like capable of downloading or reproducing in streaming audio and video contents which are stored on a server through a network.

REFERENCE SIGNS LIST

100 Client terminal
101 Web browser
102 Local application
110 Data receiving section
111 Script analyzing section
112 Browser processing section
113 Data transmitting section
114 Request header generating section
115 Session receiving section
116 Session transmitting section
117 Browser information display
118 Browser information input
120 Application session generating section
121 Application signature generating section
122 Application processing section
123 Encrypted signature decrypting section
124 Application signature verifying section
125 Server session analyzing section
126 Error handling section
127 Application information display
128 Application information input
129 Error information display
130 Application session transmitting section
131 Control section
140, 140', 140" Browser
141 Local application
142 Local application
143 Local application
144 Browser
145 Local application
146 Local application
147 Local application
150 Router
151 Client terminal
152 Client terminal
180 Network
200 Server
201 Router
202 Receiving section
203 Session analyzing section
204 HTML generating section
205 Application script generating section
206 Server session generating section
207 Response header generating section
208 Transmitting section
300 On-screen display
301 On-screen display
302 On-screen display
303 On-screen display
304 On-screen display
305 On-screen display
S400 Render on-screen display 300
S401 Select content to purchase
S402 Render on-screen display 301
S403 Select PURCHASE
S404 Generate encrypted signature
S405 Generate session information
S406 Activate browser
S407 Generate header S408 Request purchase page
S409 Transmit purchase page
S410 Render on-screen display 302
S411 Select PURCHASE
S412 Generate header
S413 Request payment page
S414 Transmit payment page
S415 Render on-screen display 303
S416 Enter credit-card information
S417 Generate header
S418 Request check page
S419 Generate application script
S420 Transmit check page
S421 Render on-screen display 304
S422 Selecting check
S423 Execute script
S424 Pass session
S425 Decrypt and verify
S426 Analyze session
S427 Render on-screen display 305
500 Data
501 Distribution server host URL
502 Session information
503 Encrypted application signature
510 Data
512 Session information
513 Encrypted application signature
520 Request
521 Extension header
530 Request
531 Extension header
540 Request
541 Extension header
550 Response
551 Extension header
552 Purchase page HTML
560 Response
561 Extension header
562 Payment page HTML
570 Response
571 Extension header
572 Check page HTML
573 Application script
800 User

The invention claimed is:

1. A client terminal connected to a server through a network, the client terminal comprising a browser and an application different from the browser,
the browser comprising:
a network transmitting section transmitting application session information and an application signature received from the application, to the server, the application session information indicating a state of the application, the application signature proving an identity of the application;
a network receiving section receiving from the server an HTML page generated by the server according to the application session information, server session information generated by the server from the application session information, and the application signature received by the server, the HTML page including an inserted script instructing the application to perform an operation;
an HTML displaying section displaying the HTML page received from the server, the HTML page including the inserted script; and
a session transmitting section transmitting the server session information and the application signature received from the server to the application in response to activation of the script;
the application comprising:
an application session generating section generating the application session information;
an application signature generating section generating the application signature;
an application session transmitting section transmitting the application session information and the application signature to the browser;
an application signature verifying section receiving, from the browser, the server session information and the application signature, which the browser has received from the server, to verify whether or not the application signature received from the browser is identical to the application signature of the application generated by the application signature generating section; and
an application control section providing control of the application so that a processing according to the server session information received from the browser, is performed only if the application signature received from the browser is identical to the application signature of the application generated by the application signature generating section.

2. The client terminal according to claim 1, wherein:
the server session information received by the network receiving section includes application state setting information inserted by the server, the application state setting information specifying a state of the application; and
the application control section extracts the application state setting information from the server session information received from the browser and sets the state of the application according to the application state setting information only if the application signature received from the browser is the application signature generated by the application signature generating section.

3. The client terminal according to claim 1, wherein:
the application comprises an encrypted signature decrypting section decrypting the application signature encrypted in a format unreadable by the server;
the application signature generating section encrypts the generated application signature into a format unreadable by the server;
the application session transmitting section transmits, instead of the application signature, the application signature encrypted by the application signature generating section, to the browser;
the encrypted signature decrypting section decrypts the encrypted application signature received from the browser; and
the application signature verifying section verifies whether or not the application signature decrypted by the encrypted signature decrypting section is the application signature generated by the application signature generating section.

4. The client terminal according to claim 1, wherein:
the application can be obtained through the network, and is one of a plurality of applications that can be obtained through the network; and
the browser is capable of connecting to more than one of the plurality of applications.

5. A server connected to a client terminal through a network, wherein a browser and an application different from the browser are running on the client terminal, the server comprising:
- a server receiving section receiving application session information generated by the application and an application signature generated by the application from the browser, the application session information indicating a state of the application, the application signature proving an identity of the application;
- an HTML generating section generating an HTML page according to the received application session information;
- an application script generating section inserting a script into the HTML page, the script instructing the application to perform an operation;
- a server session generating section generating server session information from the received application session information; and
- a server transmitting section transmitting the HTML page including the inserted script, the server session information, and the received application signature to the client terminal;
- wherein the application signature transmitted by the server transmitting section is information to be used by the application to verify whether or not the application signature transmitted by the server transmitting section is identical to the application signature generated by the application, and
- wherein a processing according to the server session information can be performed by the application only if the application signature transmitted by the server transmitting section is identical to the application signature generated by the application program.

6. A server-client system comprising a client terminal and a server connected to the client terminal through a network, wherein a browser and an application different from the browser are running on the client terminal,
- the application comprising:
- an application session generating section generating application session information indicating a state of the application;
- an application signature generating section generating an application signature proving an identity of the application;
- an application session transmitting section transmitting the application session information and the application signature to the browser;
- an application signature verifying section receiving, from the browser, server session information and an application signature, which the browser has received from the server, to verify whether or not the application signature received from the browser is identical to the application signature of the application generated by the application signature generating section; and
- an application control section providing control of the application so that a processing according to the server session information received from the browser, is performed only if the application signature received from the browser is identical to the application signature of the application generated by the application signature generating section;
- the server comprising:
- a server receiving section receiving the application session information and the application signature from the browser;
- an HTML generating section generating an HTML page according to the received application session information;
- an application script generating section inserting a script into the HTML page, the script instructing the application to perform an operation;
- a server session generating section generating the server session information from the received application session information; and
- a server transmitting section transmitting the HTML page including the inserted script, the server session information, and the received application signature to the browser;
- the browser comprising:
- a network transmitting section transmitting the application session information and the application signature received from the application session transmitting section, to the server;
- a network receiving section receiving the HTML page including the inserted script, the server session information, and the application signature from the server;
- an HTML displaying section displaying the HTML page received from the server, the HTML page including the inserted script; and
- a session transmitting section transmitting the server session information and the application signature received from the server to the application in response to activation of the script.

7. A cooperation processing method in a server-client system comprising a client terminal and a server connected to the client through a network, wherein a browser and an application different from the browser are running on the client terminal, the cooperation processing method comprising:
- an application session transmitting step of transmitting application session information and an application signature from the application to the browser, the application session information indicating a state of the application, the application signature proving an identity of the application;
- a network transmitting step of transmitting the application session information and the application signature received from the application, from the browser to the server;
- an HTML generating step of, by the server, generating an HTML page according to the received application session information and inserting a script into the HTML page, the script instructing the application to perform an operation;
- a server session generating step of, by the server, generating server session information from the received application session information;
- a server transmitting step of transmitting the HTML page including the inserted script, the server session information, and the received application signature from the server to the browser;
- an HTML displaying step of, by the browser, displaying the HTML page received from the server, the HTML page including the inserted script;
- a session transmitting step of transmitting the server session information and the application signature received from the server, from the browser to the application in response to activation of the script;
- an application signature verifying step of receiving, from the browser, the server session information and the application signature, which the browser has received from the server, to verify whether or not the application signature received from the browser is identical to the application signature generated by the application itself; and an application control step of causing the application to perform processing according to the server session information only if the application signature received from the browser is identical to the application signature generated by the application itself.

8. A non-transitory computer-readable medium having a program stored thereon for causing a computer to execute the cooperation processing method according to claim 7.

* * * * *